Patented Nov. 17, 1942

2,302,346

UNITED STATES PATENT OFFICE 2,302,246

TREATMENT OF HEADS

George M. Pohler, Louisville, Ky., assignor to Joseph E. Seagram & Sons, Inc., Shively, Ky., a corporation of Indiana No Drawing. Application March 25, 1940, Serial No. 325,785

7 Claims. (Cl. 202—57)

In the usual batch process of distilling alcohol, a quantity of liquid, commonly called "high wine," containing, say, 1,000 gallons of alcohol, is boiled in a vessel and continuously fractionated and condensed, part of the condensate being refluxed and the balance being drawn off. The first run of draw-off condensate, known as the "heads," including as much as 2 to 20% of the original 1,000 gallons, say 10% or 100 gallons, is alcohol containing low-boiling impurities. This is directed into a receiver called the "heads" tank. The next 65 to 75% of the condensate is relatively pure high-proof alcohol, which is diverted into a suitable receiver. The remainder of the condensate or "tails," which comprises high boiling fractions, including fusel oil, is diverted into another vessel called the "tails" tank.

In the continuous process, the original liquid goes into the beer still or fractionating column and the high wines derived therefrom are directed into an aldehyde column. In the aldehyde column, the heads are separated from a mixture of alcohol and tails and the mixture thereafter passed into a rectifying column where the alcohol and tails are separated, provisions usually being made for drawing off, from the aldehyde column, of high boiling esters and for directing them into a fusel oil column.

The heads obtained in either process are not strictly potable. They contain, in addition to water and alcohol, impurities which usually analyze about 95% saponifiable low-boiling esters and 2 to 3% aldehydes, the resdue being foulsmelling compounds. In order to recover relatively pure potable material from the relatively impure heads, the general practice today is to treat the heads with a single charge of sodium hydroxide so as to saponify the esters, and then with potassium permanganate so as to oxidize the aldehydes to acids. Both operations are performed at room temperature, after which the treated material is subjected to recovery distillation in which it is vaporized in a still, fractionated and condensed, the first 20% of the condensate being diverted as heads, the next 70 to 75% being recovered as a second-quality spirit, the remainder comprising a modified form of tails.

The present invention is directed to an improved process of treating the heads prior to the recovery distillation, and has, for its principal object, the provision of a treatment which results, upon recovery distillation, in the recovery of higher values from the heads. More particularly, the object of the invention is to make possible a high yield of first-quality potable spirit.

In the prior treatment, the amount of caustic, required to produce an initial pH value of 8.5 in the mixture, is added, as a single charge, to the heads alone or to a mixture of the heads and tails. When this occurs, the pH of the mixture rises quickly to 8.5 and then, as the reaction proceeds, slowly falls to some lower stable value which is reached when the reaction is complete and the mixture in equilibrium. In accordance with my invention, the heads are conditioned for superior recovery, through the usual recovery distillation, simply by adding the caustic at a rate, or in an amount, adjusted to prevent the pH from rising substantially above a desired range extending from 1 to 4 units higher than the pH of a saturated solution of sodium acetate in alcohol having the same proof as the heads, and continuing the addition until the equilibrium pH of the mixture equals the desired value. While this treatment alone permits a measurably superior product to be recovered with higher yields, a product of higher quality can be obtained by acidifying the treated heads to reduce the residual alkalinity preferably to that corresponding to the aforesaid pH of sodium acetate or lower.

In carrying out the invention, the heads are heated to reduce reaction time. A temperature range, approximating 140° to 145° F., will give good results. A dilute solution of one of the alkali earth oxides or hydroxides, or of the alkali hydroxides, such as sodium hydroxide (say, 1 to 5%), sufficient to raise the pH of the mixture initially to a value not substantially above the desired pH, i. e. 1 to 4 units above the pH of a saturated solution of sodium acetate in alcohol having the same proof as the heads, is added and the mixture preferably agitated. Since pH measurements by different instrumentalities may vary, it may be noted here that uniform and apparently reproducible measurements can ordinarily be made with the well-known "Harleco universal indicator" using "Clarks & Lubs" standard buffer solutions for comparison. The amount of the initial addition of caustic preferably is made sufficient to raise the pH to a desired value within the proper range, although a lesser amount may be used. Thereafter, the pH may be held at such desired value by adding caustic more or less continuously as required or it may be permitted to fall and then, by repeating the addition, reraised to the desired value. In any event, the rate of a continuous addition or the amounts used in repeated additions should be such as to avoid raising the pH substantially above the desired range and should be continued until the equilibrium pH falls within the desired range.

When the mixture is in equilibrium, it preferably is further treated by adding sulphuric acid in one or more additions to reduce its equilibrium pH preferably, but not necessarily, to a value corresponding to the pH of the aforesaid sodium acetate or, say, one unit more or less below such value. The pH should, in no event, be lowered to a point where "metathesis" or double decomposition takes place, i. e. where the sodium salts of the organic acids, which are formed by saponification during the alkali treatment, are broken down to the organic acids. While sulphuric acid is preferred, any other suitable non-volatile acid, such as phosphoric, or an equivalent acid salt may be used. The acid may be added without dilution, but preferably is diluted, the mixture usually being cold at the time of the addition although this is not essential.

As stated, the recovery is effected by the usual recovery distillation wherein the treated material is boiled, the vapors fractionated and condensed. At the outset of the operation, it usually is desirable to reflux the total condensate, but, after suitable refluxing, the first run of, say, 2 to 10% of the condensate is diverted as heads while the remainder is recovered as a high-proof reclaimed spirit. The quality of the reclaimed spirit is measurably superior to that of the second quality spirit derived from the prior treatment of the heads. Consequently, it may either be barreled as a second quality spirit or be fed back into the system of a continuous spirit still, say into the aldehyde column. Where it is intended to be "fed back," the first run diversion or "heads cut" may be held as low as 2% more or less. On the other hand, if it is to be used as a second quality spirit, greater purity will be insured by increasing the "heads cut" to, say, 8 to 10%.

While not definitely known, it is believed that the high quality of the distillate obtained from heads treated in accordance with my invention is due to the fact that the treating alkalinity is held as low as is practical when due regard is given to the time required for the operation. It is believed that where the pH of the heads is permitted to increase unduly, deleterious reactions take place which greatly decrease the possibility, or increase the difficulty, of obtaining a quality distillate from the treated heads. This seems to be borne out by the fact that the acid addition, which results in measurable improvement, functions to reduce the residual alkalinity of the treated material and render it neutral or slightly acidic. Whatever the cause may be, it is clear that not only is the quality of the recovery greatly improved but the amount of the recovery is increased over that heretofore obtainable.

Having described my invention, I claim:

1. An improvement in the alkali treatment of heads derived in the distillation of alcohol to recover a high proof spirit, comprising: adding an alkali to the heads at a rate controlled to raise the pH of the heads to, and maintain it within, the range of 1 to 4 units above the pH of a saturated solution of sodium acetate in alcohol having the same proof as the heads; and subjecting the treated heads to recovery distillation.

2. An improvement in the alkali treatment of heads derived in the distillation of alcohol to recover a high proof spirit, comprising: adding an alkali to the heads at a rate controlled to raise the pH of the heads to the range of 1 to 4 units above the pH of a saturated solution of sodium acetate in alcohol having the same proof as the heads; continuing the addition until the equilibrium pH is within said range; and subjecting the treated heads to recovery distillation.

3. The improvement defined in claim 1 wherein the alkali comprises an alkali hydroxide solution.

4. The improvement defined in claim 1 wherein the alkali comprises a solution of sodium hydroxide.

5. The improvement defined in claim 1 wherein the heads are maintained at a temperature of between 140° and 145° F. during the addition of the alkali.

6. An improvement in the treatment of heads derived in the distillation of alcohol to recover a high proof spirit, comprising: adding an alkali to the heads at a rate controlled to raise and maintain the pH of the heads within the range of 1 to 4 units above the pH of a saturated solution of sodium acetate in alcohol having the same proof as the heads; acidifying the mixture with a non-volatile acidic material to a pH not substantially more than 1 unit below the pH of the aforesaid sodium acetate solution; and subjecting the treated heads to recovery distillation.

7. The improvement defined in claim 6 wherein the acidic material is sulphuric acid.

GEORGE M. POHLER.